Figure 1:
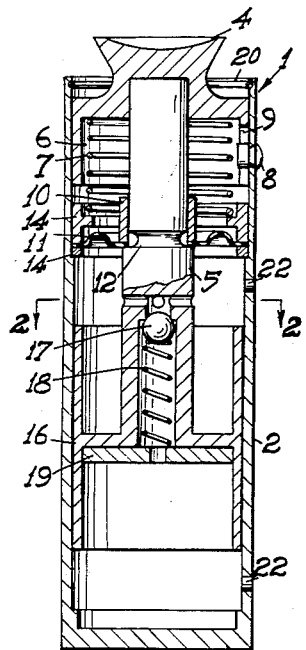

Dec. 27, 1960   D. C. WRIDE   2,966,152
SILENT CAM FOLLOWER
Filed April 7, 1959

United States Patent Office 2,966,152
Patented Dec. 27, 1960

2,966,152

SILENT CAM FOLLOWER

Donald C. Wride, 42 Landseer Crescent, Dernham Court, South Australia, Australia Filed Apr. 7, 1959, Ser. No. 804,791

Claims priority, application Australia Apr. 9, 1958

9 Claims. (Cl. 123—90)

This invention relates to a cam follower of the type which may be used in an internal combustion engine, and in particular it relates to a cam follower of the hydraulic tlue, which is commonly known as a "silent cam follower."

It has been known to make use of hydraulic cam followers in internal combustion engines, these possessing certain advantages such as automatic compensation for expansion, silence of operation, and higher efficiency from the engine. Most of the previously proposed hydraulic cam followers have made use of oil supplied at pressure from the engine, this being a somewhat complicated arrangement since it requires the use of channels or the like to conduct the oil to the location of the cam followers which of course are moving parts.

As far as is known, the problem of making a hydraulic cam follower self-contained has not been completely satisfactorily solved heretofore, and some of the difficulties which have been encountered have included the effective compensation for expansion of oil due to temperature variation.

It will be seen that the oil is confined within a closed space, and since the material surrounding that space has a different co-efficient of expansion from the hydraulic fluid within the space, it becomes necessary for some compensation of volume of oil when the unit becomes hot as in operation.

Due to the inertia of the moving parts, it is most undesirable for any free air to remain within the closed space, as this air would tend to foam and make the cam follower unduly resilient, and a further problem which has been met has been the elimination of air from all the voids within the cam follower.

While it is known that seals have been proposed between the moving and fixed parts of a hydraulic cam follower, such seals have often been of such design that axial movement of the moving part will vary the volume of or pressure within the enclosed space of the cam follower adjacent the seal, thereby providing conditions conducive to air or oil leaks.

Contrary to common belief, I have found that an important feature of a self-contained hydraulic tappet is the reduction of pressure differential across the seal to the point where it becomes negligible. For example, when seals are constructed of metal, for example of the steel bellows type, the inherent rigidity of the seal permits periods of low pressure or vacuum within the enclosed space of the cam follower adjacent the seal. These periods occur more particularly during tappet lift, when the inner member tends to be urged inwardly into the outer member. It frequently happens that a small quantity of air is entrapped within the enclosed space, and this inward movement then ceases to be negligible, so that further air is drawn in past the seal if and when this becomes imperfect. The valve lifter then increases its quantity of entrapped air and becomes resilient and thereby substantially ineffective.

Similarly, when conditions of superatmospheric pressure on one side of the seal are permitted to exist during the operation of the follower, any slight fault in the seal will allow oil to leak, and in most cases this oil will be replaced by air, again permitting resilience of the follower. If, on the other hand, the seal is of the type where it is continually urged inwardly, any loss of oil due to imperfection will also be continual.

A further difficulty is that in some cases there is not a limitation to the amount of axial movement between the outer and inner member of a cam follower, so that should, for example, a valve spring break, or should the valve keepers be lost, the valve will be continually urged further into the cylinder of a vehicle to a point where damage will occur if the engine is running.

A still further problem which has been met has been the tendency for the inner member of a hydraulic cam follower to rotate in relation to the outer member, and this tendency to rotate has been found to cause the fracture of seals which have been used when the seals are intended to perform the dual function of sealing and preventing relative rotation.

It is the object of this invention to overcome, at least to some extent, some of the above mentioned problems associated with hydraulic cam followers, and to thereby provide a cam follower of the self contained type, which is hydraulic and which is self adjusting, and which will give satisfactory service for a long period of time.

According to this invention, a cam follower comprises an outer tubular member with its lower end closed, an inner member which is either fixed to or integral with a spindle which is arranged for axial movement with relation to the outer tubular member, but which is arranged to prevent rotational movement with relation to the outer tubular member, spring means arranged to urge the inner mmeber outwardly from the outer mmeber, a resilient seal between the spindle and the outer member arranged to serve the dual function of firstly defining a closed space within the outer tubular member and secondly allowing for a certain amount of volumetric compensation, a piston co-operating with a cylinder within the closed space, hydraulic liquid filling the closed space, and valve means on the piston adapted to close to prevent displacement of hydraulic liquid through the valve means from one side of the piston to the other when the inner member is urged inwardly during tappet lift, and a controlled leakage path to allow flow of liquid past the piston for compensation purposes.

Figure 3:
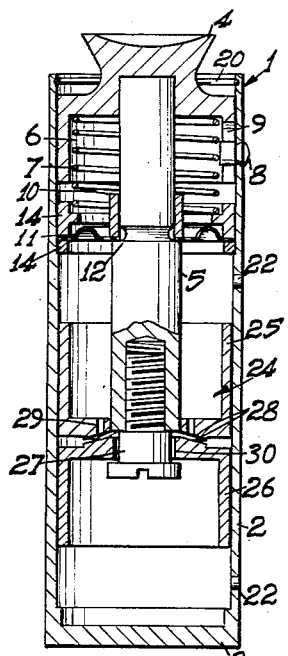
Figure 5:
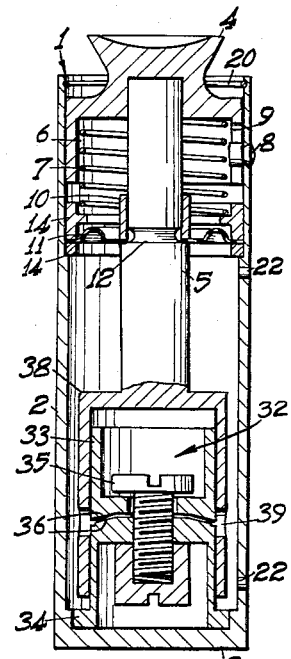
Figure 2:
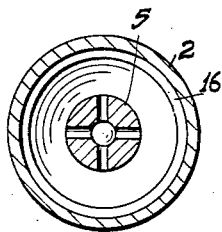
Figure 4:
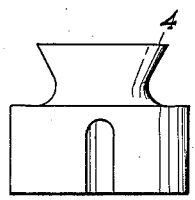

For the invention to be more clearly understood it will be described with reference to embodiments which are illustrated in the accompanying drawings in which:

Fig. 1 is a central section of a cam follower constructed according to the first embodiment, Fig. 2 is a transverse section on lines 2—2 of Fig. 1, Fig. 3 is a central section of a cam follower constructed according to a second embodiment, Fig. 4 is a side elevation of an inner member as used in these embodiments, and Fig. 5 is a central section of a third embodiment of a cam follower constructed according to this invention.

The cam follower 1 has an outer tubular member 2 with its lower end 3 closed, the inner member 4 being a press fit on to the spindle 5, and being provided with a central hollow portion 6 to accommodate a spring 7 to urge the inner member 4 outwardly from the outer tubular member 2.

A pin 8 is riveted to the wall of the outer tubular member 2 to engage a slot 9 in the inner member 4. A sleeve 10 is a press fit over the spindle 5 to sealably retain a disc-like or washer like seal 11 around the periphery of its central hole to the shoulder 12 on the spindle 5. The outer periphery of the seal 11 is engaged between the two annular rings 14, each of which is a press fit within the outer tubular member 2. The seal 11 is a diaphragm of oil resistant rubberised fabric of thickness between 0.040 inch, but may be of any of the other soft resilient flexible materials known to withstand the effects of oil and continued flexing, such as sheet polytetrafluoroethylene, or of such synthetic material as that commonly used for the diaphragm of a petrol pump.

Referring now more particularly to the embodiment shown in Fig. 1, the spindle 5 terminates at its lower end in a piston 16 which has cylindrical walls substantially long in relation to its diameter, there being a clearance between the piston 16 and the inner diameter of the outer tubular member 2 so that a certain amount of leakage may take place between the piston and the outer tubular member, which functions as a cylinder.

A ball valve 17 is inserted in the lower end of the spindle 5, and is spring loaded by a spring 18 held in place by an apertured member 19 which is a press fit within the piston 16, the ball valve being arranged to allow a rapid displacement of oil from above the piston 16 to below the piston 16 when the spring 7 urges the inner member 4, and with it the spindle 5 in an upward direction, but to prevent displacement of the oil therethrough when the inner member 4 is urged inwardly during tappet lift.

The clearance between the piston 16 and the tubular member 2 is arranged so that it provides a controlled leakage path to allow a slow flow of oil from the space beneath the piston 16 to the space above the piston 16 when the cam follower 1 is under compression, as for example during tappet lift, this allowing compensation for any tendency for the piston 16 to work its way upwardly during operation of the engine. The rate of leakage is kept within limits which will not allow undue collapse of the cam follower 1 during tappet lift while the engine is running.

In order to limit the amount of displacement of the inner member 4 from the tubular member 2, a spring clip 20 is inserted in the top of the tubular member 2 which retains the inner member 4. The tubular member 2 is apertured at two places in its wall, above and below the piston 16, so that the space defined by the tubular member 2 and the seal 11 may be completely filled with oil, after which plugs 22 are inserted and sealed in the wall of the tubular member 2.

This provides a means for completely filling the space with oil and eliminating any air which might tend to be entrapped within the space.

The closed end 3 of the tubular member 2 serves to contact the cam if the unit is to be used on a side valve engine, and the inner member 4 tends to contact the push rod in such a case, but it will be seen that in an overhead valve engine the unit may simply be used as part of the push rod.

Referring now to the embodiment shown in Fig. 3, the plugs 22 are used in a manner similar to that described above for the embodiment shown in Figs. 1 and 2, and the spring clip 20 is also used for the purpose of limiting the outward displacement of the inner member 4. In this embodiment however the piston, designated as 24, comprises an upper part 25 and a lower part 26 which are co-axial and which are held together by means of the screw threaded member 27 which is screwed into the spindle 5, and locked thereto by any known means. The upper part 25 is fixed to the lower end of the spindle 5 by means of press fitting.

The co-operating faces 28 of the parts 25 and 26 of the piston 24 are arranged to close the apertures 29 when the inner member 4 moves inwardly during tappet lift. During the periods when there is not tappet lift, the oil is free to flow from one side of the piston 24 to the other through the apertures 29 and around the clearance hole 30 surrounding the screw threaded member 27. The amount of movement between the faces 28 is adjusted by making the dimensions of the member 27 such that the free movement is equal to the optimum tappet clearance of the engine for which the unit is designed.

A controlled leakage path between the walls of the piston 24 and the tubular member 2 will allow flow of fluid past the piston for compensation purposes and prevent the piston tending to rise within the outer tubular member 2 while the engine is working.

The third embodiment as illustrated in Fig. 5 makes use again of the oil filler holes and the plugs 22 and the spring clip 20 for similar purposes to those mentioned in the previous embodiments, and in this case the piston is designated 32 and again is made up of 2 separate parts, the upper part 33 being fixed to the lower part 34 by means of the screw threaded member 35, the lower part 34 being a press fit within the tubular member 2.

As in the embodiment described in relation to Fig. 3, a pair of co-operating faces 36 between the two parts 33 and 34 of the piston 32 provide a path for hydraulic fluid flow past the piston 32 for recovery purposes, as well as performing the function of a valve in providing for an optimum tappet clearance when the unit is to be used in an engine designed for a tappet clearance. In this case the cylinder 38 is contiguous with the lower end of the spindle 5, and is provided with the apertures 39 for oil flow.

It has been found in practise that a cam follower constructed according to this invention will continue to operate nothwithstanding a leakage in the seal, but since the seal is non-metallic and very flexible, the forces imposed on it are small, and breakdown of the seal is found to be rare.

From the above embodiments it will be seen that this invention discloses a silent cam follower of the self contained type which can be constructed incorporating the features of compensations for volumetric changes due to oil temperature variations, removal of substantially all air from the closed space, movement of the inner member in relation to the outer member not varying the volume of the closed space, the variation of oil pressure at the seal locality being kept substantially small because of the flexibility of the seal, rapid displacement of oil to allow a collapsed follower to quickly regain its normal length when an engine is started, and no torsional force being applied to the seal.

What I claim is:

1. A cam follower for an internal combustion engine comprising an outer tubular member with one end closed, an inner member contiguous with a spindle co-axially slidable in said outer member, means to prevent rotation of said inner member with relation to the outer tubular member, spring means between the inner member and the outer member to urge the inner member outwardly from the outer member, a flexible non-metallic seal of less than 0.040 inch thickness between the spindle and the outer tubular member serving the dual function of firstly defining with the outer tubular member, a closed space, and secondly allowing limited volumetric compensation, a piston co-operating with a cylinder within said closed space, hydraulic liquid filling the said closed space, valve means on said piston adapted to close to prevent displacement therethrough of hydraulic liquid from one side of the piston to the other when the inner member is urged inwardly during tappet lift, and a controlled leakage path to allow flow of liquid past the piston for compensation purposes.

2. A cam follower for an internal combustion engine comprising an outer tubular member with one end closed, an inner member contiguous with a spindle, said inner member being slotted to engage a pin contiguous with the outer tubular member to allow axial non-rotational movement of the inner member with relation to the outer tubular member, spring means between the inner member, and the outer member to urge the inner member outwardly from the outer member, a flexible non-metallic seal of less than 0.040 inch thickness between the spindle and the outer tubular member serving the dual function of firstly defining with the outer tubular member, a closed space and secondly allowing limited volumetric compensation, a piston co-operating with a cylinder within said closed space, hydraulic liquid filling the said closed space, valve means on said piston adapted to close to prevent displacement therethrough of hydraulic liquid from one side of the piston to the other when the inner member is urged inwardly during tappet lift, and a controlled leakage path to allow flow of the liquid past the piston for compensation purposes.

3. A cam follower for an internal combustion engine comprising an outer tubular member with one end closed, an inner member contiguous with a spindle coaxially slidable in said outer member, means to prevent rotation of said inner member with relation to the outer tubular member, spring means between the inner member and the outer member to urge the inner member outwardly from the outer member, said inner member being limited in its axial movement away from the outer tubular member by a spring clip or the like, a flexible non-metallic seal of less than 0.040 inch thickness between the spindle and the outer tubular member serving the dual function of firstly defining, with the outer tubular member, a closed space and secondly allowing limited volumetric compensation, a piston co-operating with a cylinder within said closed space, hydraulic liquid filling the said closed space, valve means on said piston adapted to close to prevent displacement therethrough of hydraulic liquid from one side of the piston to the other when the inner member is urged inwardly during tappet lift, and a controlled leakage path to allow flow of the liquid past the piston for compensation purposes.

4. A cam follower for an internal combustion engine comprising an outer tubular member with one end closed, an inner member contiguous with a spindle, said inner member being slotted to engage a pin contiguous with the outer tubular member to allow axial non-rotational movement with relation to the outer tubular member, spring means between the inner member and the outer member to urge the inner member outwardly from the outer member, a flexible non-metallic disc-like seal of less than 0.040 inch thickness between the spindle and the outer tubular member serving the dual function of firstly defining, with the outer tubular member, a closed space and secondly allowing limited volumetric compensation, a piston co-operating with a cylinder within said closed space, hydraulic liquid filling the said closed space, valve means on said piston adapted to close to prevent displacement therethrough of hydraulic liquid from one side of the piston to the other when the inner member is urged inwardly during tappet lift, and a controlled leakage path to allow flow of the liquid past the piston for compensation purposes.

5. A cam follower for an internal combustion engine comprising an outer tubular member with one end closed, an inner member contiguous with a spindle coaxially slidable in said outer member, means to prevent rotation of said inner member with relation to the outer tubular member, spring means between the inner member and the outer member to urge the inner member outwardly from the outer member, a flexible non-metallic seal of less than 0.040 inch thickness between the spindle and the outer tubular member serving the dual function of firstly defining, with the outer tubular member, a closed space and secondly allowing limited volumetric compensation, a piston co-operating with a cylinder within said closed space, hydraulic liquid filling the said closed space, said hydraulic liquid being inserted into said closed space through apertures in said outer tubular member above and below said piston, said apertures liquid closed after said space has been filled, valve means on said piston adapted to close to prevent displacement therethrough of hydraulic liquid from one side of the piston to the other when the inner member is urged inwardly during tappet lift, and a controlled leakage path to allow flow of the liquid past the piston for compensation purposes.

6. A cam follower for an internal combustion engine comprising an outer tubular member with one end closed, an inner member contiguous with a spindle co-axially slidable in said outer member, means to prevent rotation of said inner member with relation to the outer tubular member, spring means between the inner member and the outer member to urge the inner member outwardly from the outer member, a flexible non-metallic disc-like seal of less than 0.040 inch thickness between the spindle and the outer tubular member, said seal being sealably secured around its outer periphery to said outer tubular member, and being sealably secured around the inner periphery of a central aperture to said spindle, said seal serving the dual function of firstly defining, with the outer tubular member, a closed space and secondly allowing limited volumetric compensation, a piston co-operating with a cylinder within said closed space, hydraulic liquid filling the said closed space, valve means on said piston adapted to close to prevent displacement therethrough of hydraulic liquid from one side of the piston to the other when the inner member is urged inwardly during tappet lift, and a controlled leakage path to allow flow of the liquid past the piston for compensation purposes.

7. A cam follower for an internal combustion engine comprising an outer tubular member with one end closed, an inner member contiguous with a spindle coaxially slidable in said outer member, means to prevent rotation of said inner member with relation to the outer tubular member, spring means between the inner member and the outer member to urge the inner member outwardly from the outer member, a disc-like seal of oil resistant rubber of less than 0.040 inch thickness between the spindle and the outer tubular member serving the dual function of firstly defining, with the outer tubular member, a closed space and secondly allowing limited volumetric compensation, a piston co-operating with a cylinder within said closed space, hydraulic liquid filling the said closed space, valve means on said piston adapted to close to prevent displacement therethrough of hydraulic liquid from one side of the piston to the other when the inner member is urged inwardly during tappet lift, and a controlled leakage path to allow flow of the liquid past the piston for compensation purposes.

8. A cam follower for an internal combustion engine comprising an outer tubular member with one end closed, an inner member contiguous with a spindle coaxially slidable in said outer member, means to prevent rotation of said inner member with relation to the outer tubular member, spring means between the inner member and the outer member to urge the inner member outwardly from the outer member, a seal of polytetrafluoroethylene of less than 0.040 inch thickness between the spindle and the outer tubular member serving the dual function of firstly defining, with the outer tubular member, a closed space and secondly allowing limited volumetric compensation, a piston co-operating with a cylinder within said closed space and being provided with a ball valve, said piston being a clearance fit within the outer tubular member, hydraulic liquid filling the said closed space, valve means on said piston adapted to close to prevent displacement therethrough of hydraulic liquid from one side of the piston to the other when the inner member is urged inwardly during tappet lift, and a controlled leakage path to allow flow of the liquid past the piston for compensation purposes.

9. A cam follower for an internal combustion engine comprising an outer tubular member with one end closed, an inner member contiguous with a spindle co-axially slidable in said outer member, means to prevent rotation of said inner member with relation to the outer tubular member, spring means between the inner member and the outer member to urge the inner member outwardly from the outer member, a flexible non-metallic seal of less than 0.040 inch thickness between the spindle and the outer tubular member serving the dual function of firstly defining with the outer tubular member, a closed space, and secondly allowing limited volumetric compensation, a piston co-operating with a cylinder within said closed space, hydraulic liquid filling said closed space, said piston comprising two parts disposed end to end for coaxial relative movement, apertures in at least one of said parts and sealably co-operating faces between said parts comprising valve means adapted to close to prevent displacement therethrough of hydraulic liquid from one side of the piston to the other when the inner member is urged inwardly during tapped lift, and a controlled leakage path to allow flow of liquid past the piston for compensation purposes.

References Cited in the file of this patent

UNITED STATES PATENTS

| | | |
|---|---|---|
| 2,213,195 | Banker | Sept. 3, 1940 |
| 2,278,963 | Arola | Apr. 7, 1942 |